United States Patent
Burrell et al.

(10) Patent No.: US 12,058,642 B2
(45) Date of Patent: Aug. 6, 2024

(54) SYSTEM AND METHOD FOR MATCHING USING LOCATION INFORMATION

(71) Applicant: Match Group, LLC, Dallas, TX (US)

(72) Inventors: Robinne Burrell, Los Angeles, CA (US); Anna M. Schneider, Fort Worth, TX (US); Sharmistha Dubey, Coppell, TX (US); Shane Henderson, Allen, TX (US); Deryl Dorsett, Dallas, TX (US)

(73) Assignee: MATCH GROUP, LLC, Dallas, TX (US)

( * ) Notice: Subject to any disclaimer, the term of this patent is extended or adjusted under 35 U.S.C. 154(b) by 0 days.

(21) Appl. No.: 18/187,038

(22) Filed: Mar. 21, 2023

(65) Prior Publication Data

US 2023/0337174 A1    Oct. 19, 2023

Related U.S. Application Data

(63) Continuation of application No. 17/575,933, filed on Jan. 14, 2022, now Pat. No. 11,632,736, which is a
(Continued)

(51) Int. Cl.
*H04W 64/00* (2009.01)
*G08B 1/08* (2006.01)
(Continued)

(52) U.S. Cl.
CPC ........... *H04W 64/00* (2013.01); *H04W 4/021* (2013.01); *H04W 4/023* (2013.01); *H04W 4/029* (2018.02);
(Continued)

(58) Field of Classification Search
CPC ........ H04W 4/021; H04W 4/02; H04W 4/206
See application file for complete search history.

(56) References Cited

U.S. PATENT DOCUMENTS

| 6,618,593 B1 | 9/2003 | Drutman et al. |
| 7,203,502 B2 | 4/2007 | Wilson et al. |

(Continued)

OTHER PUBLICATIONS

"How about we?", © 2011 This Life, Inc., http://www.howaboutwe.com/about, 3 pages.
(Continued)

*Primary Examiner* — Natasha W Cosme
(74) *Attorney, Agent, or Firm* — Baker Botts L.L.P.

(57) ABSTRACT

In one embodiment, a method executed by at least one processor includes receiving first historical location information identifying a first location area at which a first user was present at a first time and receiving second location information identifying a second location area at which a second user was present at a second time. The method includes determining that the first historical location information and the second location information each correspond to a particular location area and determining that a characteristic related to the first user corresponds to a preference related to the second user. In response to these determinations, the method includes causing information related to the first user to be presented to the second user. The information related to the first user includes the first location area of the first user relative to the second location area of the second user.

20 Claims, 4 Drawing Sheets

Related U.S. Application Data continuation of application No. 16/805,989, filed on Mar. 2, 2020, now Pat. No. 11,259,265, which is a continuation of application No. 16/173,645, filed on Oct. 29, 2018, now Pat. No. 10,624,054, which is a continuation of application No. 13/270,323, filed on Oct. 11, 2011, now Pat. No. 10,149,267.

(51) Int. Cl.

| | | |
|---|---|---|
| *H04W 4/02* | (2018.01) | |
| *H04W 4/021* | (2018.01) | |
| *H04W 4/029* | (2018.01) | |
| *H04W 4/21* | (2018.01) | |
| *H04W 4/33* | (2018.01) | |

(52) U.S. Cl.
CPC ......... *H04W 4/21* (2018.02); *G08B 2001/085* (2013.01); *H04W 4/33* (2018.02)

(56) References Cited

U.S. PATENT DOCUMENTS

| | | | |
|---|---|---|---|
| 7,765,265 | B1 | 7/2010 | Granito |
| 8,229,458 | B2 | 7/2012 | Busch |
| 8,312,087 | B2 | 11/2012 | Svendsen et al. |
| 2006/0161599 | A1 | 7/2006 | Rosen |
| 2006/0270419 | A1 | 11/2006 | Crowley |
| 2008/0188261 | A1 | 8/2008 | Amone |
| 2009/0012955 | A1* | 1/2009 | Chu ............... G06Q 30/0261 707/999.005 |
| 2009/0082038 | A1 | 3/2009 | McKiou |
| 2009/0097710 | A1 | 4/2009 | Sroka |
| 2009/0287763 | A1 | 11/2009 | Svendsen et al. |
| 2010/0299060 | A1 | 11/2010 | Snavely |
| 2012/0150955 | A1 | 6/2012 | Tseng |
| 2013/0097162 | A1 | 4/2013 | Corcoran |
| 2020/0175612 | A1* | 6/2020 | Montoya ............... H04L 67/306 |

OTHER PUBLICATIONS

"Grindr. It's a guy thing.", Grindr © Copyright 2011 Grindr, L.L.C., http://www.grindr.com/Grindr_iPhone_App/What is Grindr.html; 5 pages.

"Grindr guys, get started here." Grindr © Copyright 2011 Grindr, L.L.C., http://www.grindr.com/Grindr_iPhone_App/How_to_use_Grindr.html; 2 pages.

"Foursquare", © 2011 foursquare, https://foursquare.com/about, 2 pages.

"Yelp", http://www.yelp.com/faq, 6 pages.

"Share Where You Are", Facebook © 2011, http://www.facebook.com/about/location, 3 pages.

"The Facebook Blog", Facebook © 2011, http://blog.facebook.com/blog.php?post=10150251867797131;, 9 pages.

"Dig Into the Details", Facebook © 2011, http://www.facebook.com/about/details/, 5 pages.

"Gowalla", From Wikipedia, the free encyclopedia, http://en.wikipedia.org/wiki/Gowalla, 3 pages.

"SingleSquare", KB Applications © 2010, http://www.singlesq.com/AboutUs.php, 2 pages.

* cited by examiner

SYSTEM AND METHOD FOR MATCHING USING LOCATION INFORMATION

PRIORITY

This nonprovisional application is a continuation, under 35 U.S.C. § 120, of U.S. patent application Ser. No. 17/575,933 filed on Jan. 14, 2022; which is a continuation of U.S. application Ser. No. 16/805,989 filed on Mar. 2, 2020, now U.S. Pat. No. 11,259,265; which is a continuation of U.S. application Ser. No. 16/173,645 filed Oct. 29, 2018, now U.S. Pat. No. 10,624,054; which is a continuation of U.S. application Ser. No. 13/270,323 filed Oct. 11, 2011, now U.S. Pat. No. 10,149,267, and entitled "System and Method for Matching Using Location Information."

TECHNICAL FIELD

This invention relates generally to communication systems and more particularly to a system and method for matching using location information.

BACKGROUND

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections.

Certain network protocols may be used m order to allow an end user to conduct an on-line search of candidates to fill a given vacancy. These protocols may relate to job searches, person finding services, real estate searches, or on-line dating. While some believe that on-line dating is simply a matter of matching supply and demand, there is statistical and empirical evidence to suggest that successful on-line dating entails far more.

For example, people having similar and/or compatible character traits and values should be matched together. However, effectively linking two participants together can prove to be a challenging endeavor. Coordinating a relationship between two like-minded individuals can be a significant chore, as there are a number of obstacles and barriers that must be overcome.

One problem is that the search results of these services contain many irrelevant entities to the searcher. This costs the user of the service time and may deter them from continuing through all of the search results.

Another problem that has arisen is that matching services have used textual submissions (such as profiles or messages) to determine matches. Users, though, often meet and evaluate others for potential matching using other criteria that matching services have not incorporated.

SUMMARY

In one embodiment, a method executed by at least one processor includes receiving first historical location information identifying a first location area at which a first user was present at a first time. The method includes receiving second location information identifying a second location area at which a second user was present at a second time. Also, the method includes determining that the first historical location information and the second location information each correspond to a particular location area. In addition, the method includes determining that a characteristic related to the first user corresponds to a preference related to the second user. In response to determining that the first historical location information and the second location information each correspond to the particular location area and in response to determining that the characteristic related to the first user corresponds to the preference related to the second user, the method includes causing information related to the first user to be presented to the second user. The information related to the first user includes the first location area of the first user relative to the second location area of the second user.

In some embodiments, the location area may be a location type. Causing information related to the first user to be presented to the second user may be performed in response to determining that the difference between the second time and the first time is less than a time threshold. The method may include comparing the first historical location information and the second location information to a database. The database may correlate location information with points-of-interest.

In one embodiment, a system includes an interface. The interface is configured to receive first historical location information identifying a first location area at which a first user was present at a first time and receive second location information identifying a second location area at which a second user was present at a second time. The system includes at least one processor configured to determine that the first historical location information and the second location information each correspond to a particular location area. The at least one processor is also configured to determine that a characteristic related to the first user corresponds to a preference related to the second user. In response to determining that the first historical location information and the second location information each correspond to the particular location area and in response to determining that the characteristic related to the first user corresponds to the preference related to the second user, the at Least one processor is configured to cause information related to the first user to be presented to the second user. The information related to the first user includes the first location area of the first user relative to the second location area of the second user.

Depending on the specific features implemented, particular embodiments may exhibit some, none, or all of the following technical advantages. Various embodiments may be capable of allowing a user to submit location information (such as persistent location information) in order to obtain more relevant matches. In some embodiments, a user may be notified of potential matches who visit the same places as the user, thereby providing the user with matching results that may be more relevant. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1A:
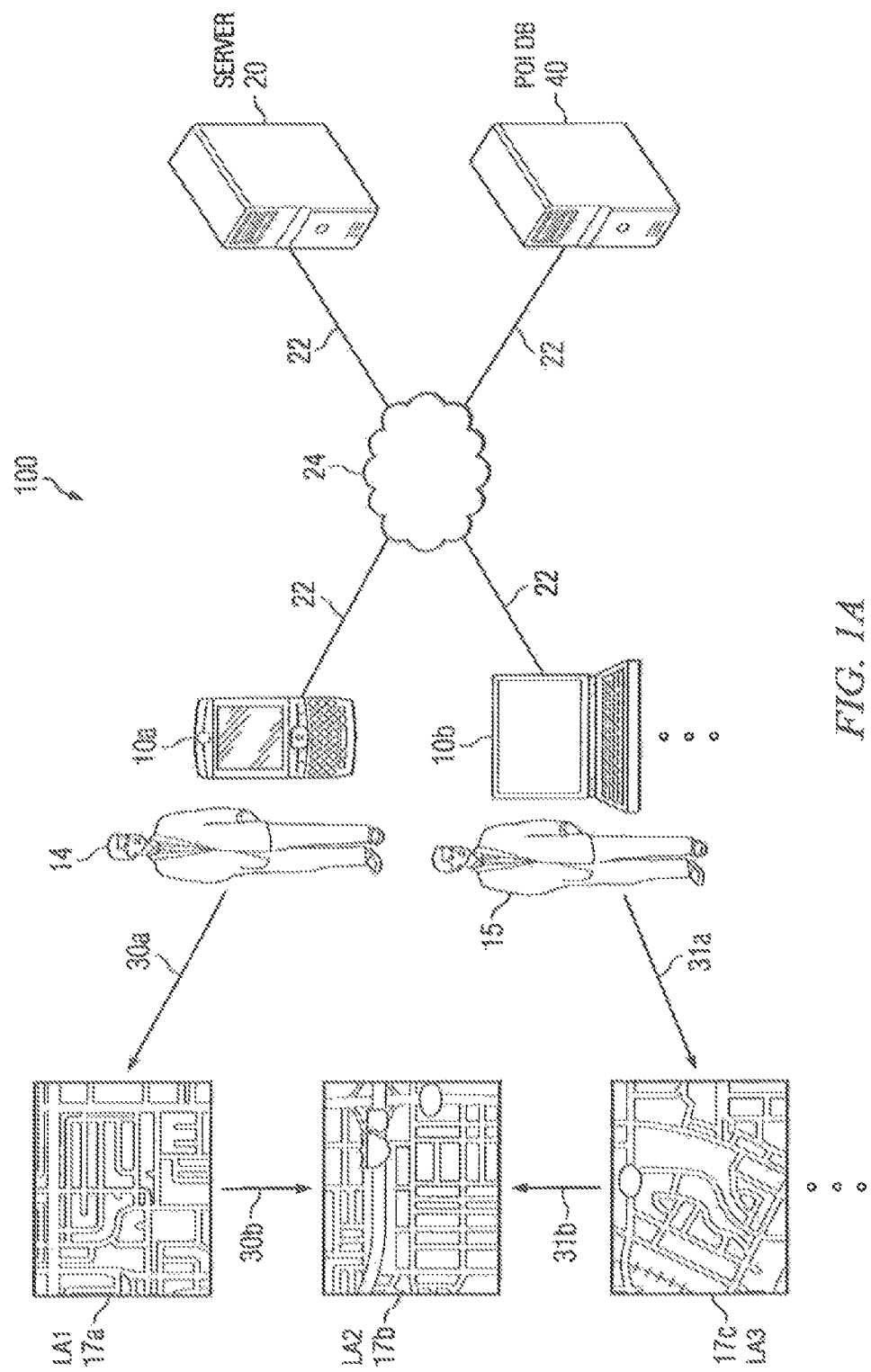
FIG. 1A is a simplified block diagram of a system for facilitating communication in a network environment, in accordance with a particular embodiment.
Figure 1B:
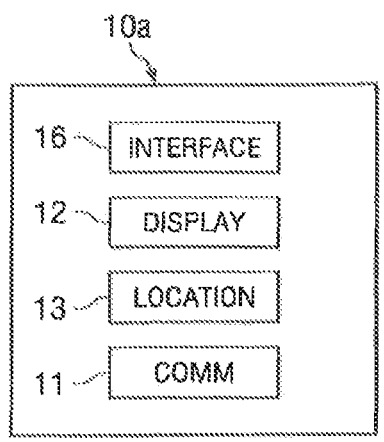
FIG. 1B shows the contents of the terminal from FIG. 1A.
Figure 1C:
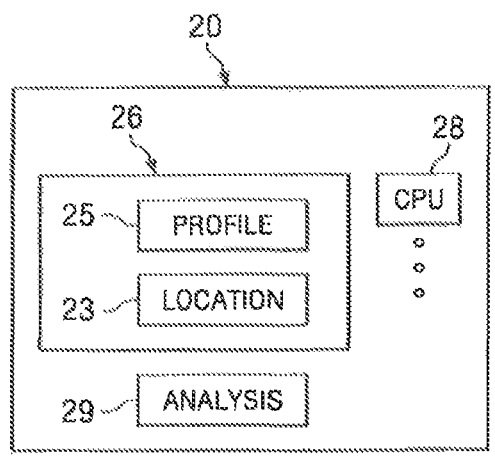
FIG. 1C shows the contents of the matching server from FIG. 1A.

Referring to FIG. 1A, one embodiment of a communication system is shown. FIG. 1A is a simplified diagram of a system 100 for facilitating communication in a network environment. Users 14-15 interact with server 20 through terminals 10a-b. Users 14-15 travel to location areas 17a-c as indicated by paths 30a-b and 31a-b. Server 20 is coupled to points of interest ("POI") database 40. FIG. 1B is a diagram showing, in one embodiment, example contents of terminal 10a. Terminal 10a comprises communication module 11, display 12, location module 13, and interface 16 (so that user 14 may be able to interact with terminal 10a). FIG. 1C is a diagram showing, in one embodiment, example contents of server 20. Server 20 comprises memory 26, at least one CPU 28, and analysis module 29. Terminals 10a-b and server 20 are communicatively coupled via network connections 22 and network 24. In some embodiments, analysis module 29 may be configured to analyze location information, preferences, and characteristics sent from users 14-15 and determine whether user 14 should receive information related to user 15.

Users 14-15 are clients, customers, prospective customers, or entities wishing to participate in an on-line dating scenario and/or to view information associated with other participants in the system. Users 14-15 may also seek to access or to initiate communication with other users that may be delivered via network 24. Users 14-15 may review data (such as profiles, for example, with user characteristics and preferences) associated with other users in order to make matching decisions or elections. Data, as used herein, refers to any type of numeric, voice, video, text, or location data, or any other suitable information in any appropriate format that may be communicated from one point to another.

In one embodiment, terminals 10a-b represent (and are inclusive of) a personal computer that may be used to access network 24. Alternatively, terminals 10a-b may be representative of a cellular telephone, an electronic notebook, a tablet computer, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface 16 may be a unique element designed specifically for communications involving system 100. Such an element may be fabricated or produced specifically for matching applications involving a user.

Communication module 11 may be implemented using any suitable combination of hardware, firmware, and software. Communication module 11, in some embodiments, may be a modem, network interface card, wireless communication device, cellular data communication device, or other suitable module for communicating information using connections 22. Communication module 11 may communicate one or more communication schemes, such as those defined by the IEEE LAN/MAN Standards Committee (IEEE 802), including both wired and wireless standards.

Display 12, m some embodiments, may be a computer monitor, a liquid crystal display (LCD), an active-matrix organic light-emitting diode display (AMOLED), a super AMOLED, a light-emitting diode (LED) based display, or other suitable displays for desktop and/or mobile devices. Alternatively, display 12 may be a projector, speaker, or other device that allows users 14-15 to appreciate information that system 100 transmits.

Location module 13 may be implemented using any suitable combination of hardware, firmware, and software. Location module 13 may determine information regarding the physical location of terminal 10a. Examples of such location information include latitude/longitude coordinates, physical address, zip code, area code, city, county, state, country, and geographic area. Location module 13 may determine the location information using one or more suitable technologies, such as Global Positioning System (GPS), available IEEE 802.11 networks, and cellular radio signals. For example, location module 13 may use triangulation of wireless signals such as 802.11 networks and/or cellular radio signals. As another example, Uplink Time Difference of Arrival (U-TDOA) may be used by location module 13 to determine location information. In some embodiments, location module 13 may determine location information using input from a user (such as users 14-15). For example, location module 13 may use user input as one factor in determining location and rely on other technologies to make a determination as to the location of terminal 10a. As another example, location module 13 may allow user 14 to specify location information (i.e., an intersection, an address, or a business). A user may specify location information by selecting location information from a list or map provided by location module 13.

Network 24 comprises one or more communicative platforms operable to exchange data or information emanating from users 14-15. Network 24 could include a plain old telephone system (POTS). Transmission of information emanating from the user may be assisted by management associated with server 20 or manually keyed into a telephone or other suitable electronic equipment. In some embodiments, network 24 could include any packet data network offering a communications interface or exchange between any two nodes in system 100. Network 24 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above. In various embodiments, network connections 22 may include wired and/or wireless mediums which may be provisioned with routers and firewalls.

In some embodiments, POI database 40 may be implemented using any suitable combination of hardware, firmware, and software. POI database 40 may include data indicating what is available at certain geographic locations. For example, POI database 40 may include data regarding restaurants, retailers, gas stations, historical sites, counties, cities, metropolitan areas, zip codes, or other locations that may be of interest to users such as users 14 and 15. Examples of POI database 40 include the CITYSEARCH database and the POYNT database.

Server 20 is operable to receive and to communicate information to terminal 10. In some embodiments, server 20 may comprise a plurality of servers or other equipment, each performing different or the same functions in order to receive and communicate information to terminal 10. Server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In some embodiments, server 20 may comprise one or more clusters of virtual or hardware-based computing nodes, a distributed computing infrastructure, or other suitable forms of providing a software service using multiple computers. In some embodiments, server 20 may offer one or more services to users 14 and 15 via network 24 such as social networking, professional networking, conference services, messaging, gaming, online dating, marketplace, discussion board, news, travel services, retail services, or other suitable services. Server 20 can be used to identify and to evaluate suitable candidates in various areas (e.g. hiring/employment, recruiting, real estate, general person searches, online dating, etc.).

In some embodiments, memory 26 may include multiple storage structures, such as storage structures 23 and 25, one or file systems, as well as other suitable structures for storing and retrieving data. For example, storage structures 23 and 25 may be implemented using one or more databases, file systems, tables, stacks, heaps, or other suitable storage structures.

In some embodiments, location areas 17*a-c* may be a geographic area that users 14-15 visit. Examples of location areas include: latitude/longitude coordinates, a physical address, an intersection of streets, a city, a state, a zip code, a region, a province, a region defined by an area code, a business, a neighborhood, a shopping center, a borough, or other suitable geographic areas. In some embodiments, location areas 17*a-c* may be a location type, such as a business, a historical site, a library, or a restaurant. As another example, location areas 17*a-c* may be an event at a location area, such as a concert, speech, or a sports event.

In some embodiments, users 14-15, using terminals 10, register with server 20. Registration may include users 14-15 submitting information to server 20 about users 14-15 as well as characteristics with which users 14-15 are seeking to be matched. In various embodiments, server 20 may be configured to collect this information; for example, such information may include gender, preferred gender of a potential match, height, weight, age, location, ethnicity, birthplace, eating habits, activities, and goals. Server 20 may further receive information regarding what users 14-15 may be looking for in a match, such as gender, age, weight, height, location, ethnicity, diet, and education.

Further, server 20 may receive information from users 14-15 indicating how important certain factors are when looking for a match. For example, server 20 may allow the user to indicate which characteristics in a potential match are a necessity. In another example, server 20 may ask, "How important is it that your match does not smoke?" Server 20 may also allow the user to indicate that certain characteristics are not important search criteria. For example, when asking user 14 about what height or weight user 14 is seeking in a match, server 20 may be configured to receive "not important" as a response. In yet another example, server 20 may allow user 14 to rate which factors are important on a numerical scale. For example, server 20 may ask user 14 the following: "On a scale of 1-10, how important is it that your match has the same education level as you?" In some embodiments, server 20 may specify that any number of questions or requested descriptions are necessary before registration may be concluded. As an example only, server 20 may require that user 14 communicate the sex of user 14 and the sex user 14 prefers to be matched with. Server 20 may be configured to receive the information submitted by users 14-15 and create profiles for users 14-15 based on that information, storing the profiles in memory 26, such as in storage structure 25.

In some embodiments, server 20 may receive information from users 14-15 after registration. Server 20 may receive location information from users 14-15 after registration has been completed. For example, terminal 10*a* may be configured to send location information regarding user 14 to server 20 passively or actively. For example, user 14 may travel to location area 17*a* as indicated by path 30*a*. At location area 17*a*, terminal 10*a* may transmit location information to server 20 (such as latitude and longitude coordinates). This may be done in response to user 14 requesting that terminal 10*a* transmit the location information, or terminal 10*a* may automatically send the location information. As another example, an application in terminal 10*a* may be configured to send location information regarding user 14 to server 20 periodically or continuously. The application may be configured to operate as a background process on terminal 10*a*. The location information may be transmitted using connections 22 and network 24. Server 20 may receive location information and store it in storage structure 23. Server 20 may also store the time when the location information was received from user 14 in storage structure 23.

In some embodiments, analysis module 29 may be implemented using any suitable combination of hardware, firmware, and software. Analysis module 29 may be configured to search through information such as profiles stored in storage structure 25 regarding users (such as users 14-15) and present matches to user 14. Techniques for determining relevant matches for users are well known in the art. Some include determining how closely one users preferences match another use's characteristics and vice versa. In some embodiments, server 20 may be configured to generate a pool of potential matching users for user 14 according to various characteristics and preferences of user 14 and other users of the system. Server 20 may assign scores to the pool of potential matching users for user 14 based on preferences and/or activity of user 14. Server 20 may also restrict entities from being included in the pool of potential matching users based on the status of the profile, location information regarding the entity, or location information regarding user 14. User 14 may specify a preference to be matched with or not to be matched with users that visit certain locations or location types, such as stores, libraries, or restaurants. User 14 may specify a preference to be matched with or not to be matched with users that visit the same locations or location types as user 14. Analysis module 29 may use the location information in storage structure 23 received from users 14 and 15 when applying preferences regarding location information of user 14 when determining matching users for user 14.

In some embodiments, analysis module 29 may be configured to present information regarding other users registered with server 20 (such as user 15) to user 14 based on the present or past location(s) of user 14. For example, users 14 and 15 may travel to location areas 17a-c as indicated by paths 30a-b and 31a-b. User 15 arrives at location area 17b and terminal 10b transmits location information regarding user 15 and location area 17b to server 20. At a later time, after user 15 has left location area 17b, user 14 arrives at location area 17b. Terminal 10a sends location information regarding user 14 and location area 17b to server 20. Then, server 20 sends a notification to terminal 10a indicating that user 15 was at location area 17b. Server 20 may send the notification after determining that user 15 has one or more characteristics that are preferable to user 14. The notification may be sent after user 14 has departed location area 17b. Server 20 may provide an indication of the time difference between when user 14 arrived at location area 17b and when user 15 was at location area 17b. Server 20 may send information regarding user 15 to user 14. User 14 may also receive (using terminal 10a) information regarding other users who are registered with server 20 that have also been at location area 17b previous to user 14. For example, server 20 may send a list of users who have been at location area 17b and indicate when each of those users were at location area 17b relative to when user 14 was at location area 17b.

In some embodiments, notifications to user 14 may provide information regarding when and where other users (such as user 15) have been as they relate to when and where user 14 has been. The notifications may include information regarding a location area 17a-c at which user 15 may have been present relative to a location area 17a-c at which user 14 may be or have been present. For example, a notification may notify user 14 that user 14 missed being in the same location area as user 15 by a certain amount of time and may present information regarding user 15 to user 14. For example, the notification may notify user 14 that user 14 missed being at the same restaurant as user 15 by 15 minutes and may provide information regarding user 15 such as a picture, profile information, or user identifier. The information provided may indicate that user 15 may be a good match for user 14. A notification may notify user 14 that user 14 has similar patterns of behavior as user 15, such as visiting the same type of location at the same or different times. For example, the notification may notify user 14 that user 14 and user 15 visit the same location area everyday (such as a coffee shop), visit the same park in the mornings, go to a gym three times a week, or attended the same event the previous night. A notification may notify user 14 that user 15 goes to the same type of locations as user 14. For example, a notification may notify user 14 that user 14 and user 15 go to coffee shops in the morning or go to gyms in the evening. A notification may notify user 14 that user 15 travels the same or similar routes and/or paths as user 14 (i.e., user 14 and user 15 visit the same locations in the same order). As examples, a notification may notify user 14 that user 14 and user 15 take the same bus to work, use the same roads to get to work, attend the same restaurant and then the same movie theatre, or go to the same gym and then the same smoothie store. A notification may notify user 14 that user 15 are in nearby location areas at the same or different times. As examples, a notification may notify user 14 that user 14 and user 15 work on the same block during the week or that user 14 and user 15 go to restaurants in adjacent boroughs on different days.

In some embodiments, this may provide an advantage in that user 14 may be provided with other users who visit the same location as user 14 which may interest user 14 in being matched with such users. Another example of how this may be advantageous is that server 20 may provide potential matches to user 14 in a manner that may be more relevant to user 14 given that such matches have visited the same location area 17b as user 14.

In some embodiments, analysis module 29 may be configured to receive a request from user 14 to be matched with users in the same location or location type as the present location of user 14. For example, user 14 may travel to location area 17a as indicated by path 30a. User 14 causes terminal 10a to send an indication to server 20 that user 14 would like to be matched with other users that have been in location area 17a or in a type of location that is similar to location area 17a. Terminal 10a sends the preference(s) of user 14 along with location information regarding location area 17a to server 20. Server 20 uses location information stored in storage structure 23 of other users (such as user 15) registered with server 20 to determine users to match with user 14. Server 20 may use information from POI database 40 to determine location types that may be similar to location area 17a. Server 20 may also use other characteristics of users registered with server 20, such as those stored in storage structure 25 (including profile information), to determine users that may be of interest to user 14. Analysis module 29 performs comparisons to determine which users should be presented to user 14. The comparisons may take into account the preference expressed by user 14 regarding location area 17a. The comparisons may be performed by scoring various characteristics of the users in light of stated preferences and activity of user 14. In some embodiments, this may be advantageous in that user 14 may be able to express location as a preference to enhance the search for matches performed by server 20 which may provide more relevant potential matches.

In some embodiments, analysis module 29 may be configured to provide an indication to user 14 of other users registered with server 20 (such as user 15) that may be in the same location or location type as user 14. For example, user 15 may arrive at location area 17b as indicated by paths 31a and 31b. Sometime later, user 14 arrives at location area 17b as indicated by paths 30a and 30b. After arriving at location area 17b, terminal 10b transmits location information regarding user 15 and location area 17b to server 20. After arriving at location area 17b, terminal 10a transmits information regarding user 14 and location area 17b to server 20. User 14 may send a request to server 20 to receive information regarding other users registered with server 20 that may be at location area 17b. Analysis module 29 analyzes location information in storage structure 23 and information regarding characteristics of users registered with server 20 in storage structure 25 to determine other users of server 20 that may be at location area 17b. Analysis module 29 may cause an indication to be sent to user 14 that provides information regarding one or more users (such as user 15) that may also be at location 17b at the same time as user 14 who have one or more characteristics that match preferences previously submitted by user 14. The indication may be sent after user 14 has departed from location 17h or while user 14 is still at location 17b. Analysis module 29 may be configured to receive and process location information from user 14 and provide the indication to user 14 in real time. In some embodiments, presenting an indication to user 14 informing user 14 of one or more users that are at or have been at the same or similar location areas as user 14 may be advantageous in that user 14 may be provided information regarding other users that may be of interest to user 14 that are in the same location as user 14. This may provide user 14 an opportunity to meet people in whom user 14 may have an interest.

Figure 2:
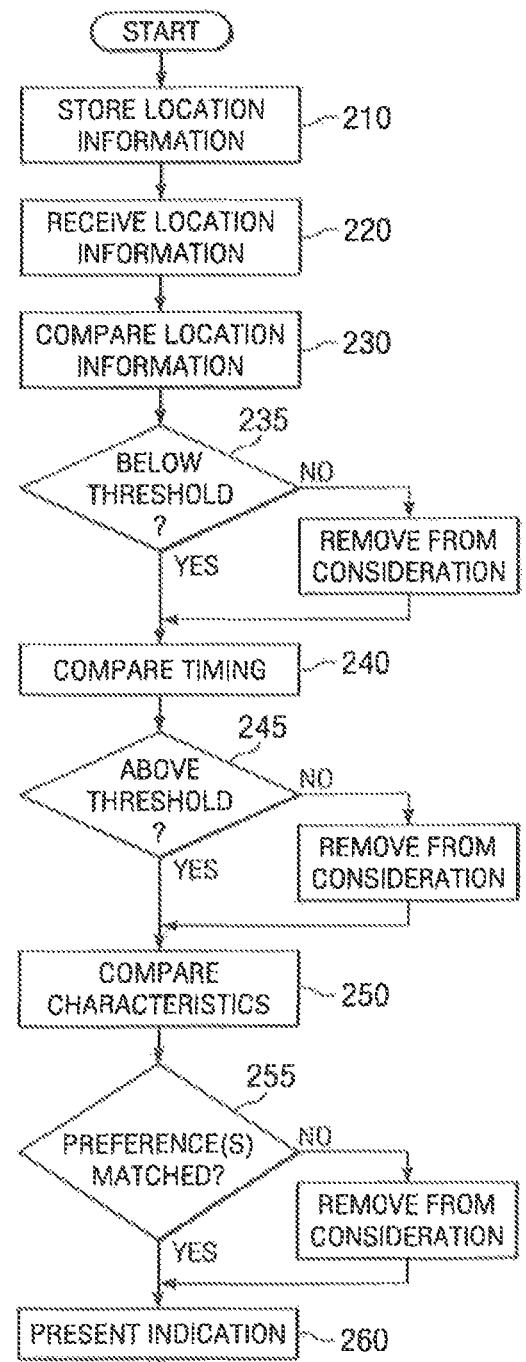
FIG. 2 is a flowchart illustrating one embodiment of providing information regarding users that have visited a location.
Figure 3:
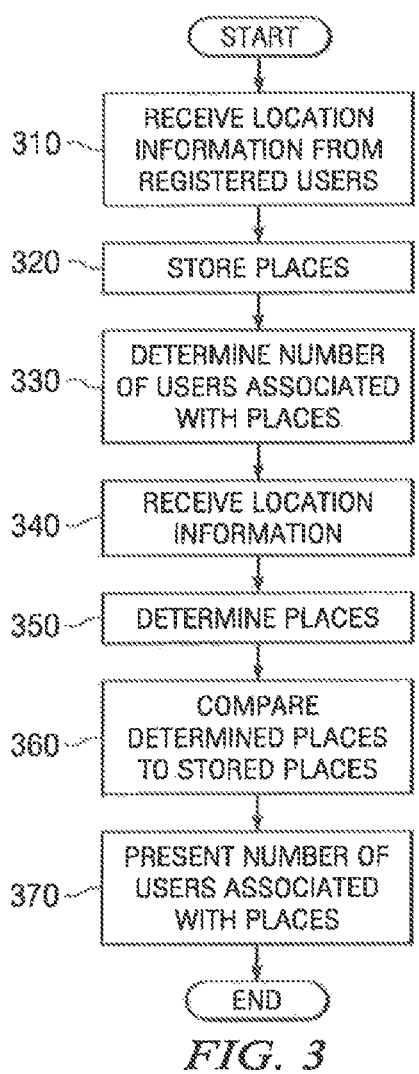
FIG. 3 is a flowchart illustrating one embodiment of providing an indication of the number of users that have visited places in a location area.
Figure 4:
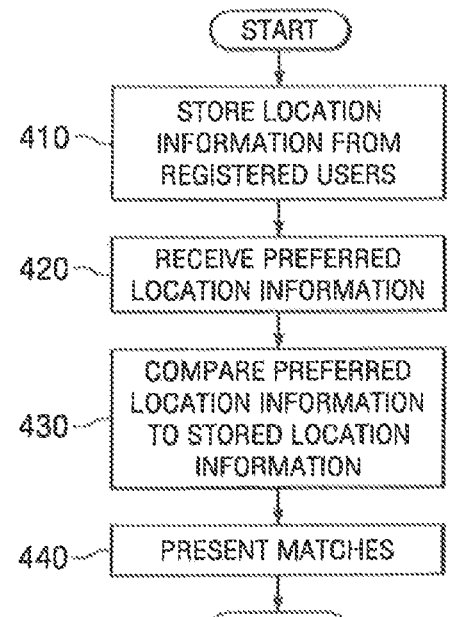
FIG. 4 is a flowchart illustrating one embodiment of enhancing matching services based on received preferred location information.

FIGS. 2-4 are flowcharts illustrating embodiments of the operation of system 100 of FIG. 1A. In general, the steps illustrated in FIGS. 2-4 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1A-1C or other suitable elements.

FIG. 2 is a flowchart illustrating one embodiment of how analysis module 29 of FIG. 1C may provide an indication to user 14 of FIG. 1A of users registered with server 20 of FIG. 1A (such as user 15) that were at a location area or location type where user 14 also was at some time. One or more of the steps illustrated in FIG. 2 may be repeated by analysis module 29 for one or more users that have registered with server 20.

At step 210, in some embodiments, server 20 may receive and store location information from various users who have registered with server 20 (such as user 15). For example, historical location information may be received at this step indicating location areas where users registered with server 20 have been. Terminals such as terminals 10*a-b* may send the location information using modules such as location module 13. The location information may include information regarding one or more of: longitude/Latitude coordinates, a physical address, an intersection, a neighborhood, a county, a city, a state, a zip code, an area code, a region, a country, or other suitable information that describes geographic location. In some embodiments, a tolerance parameter(s) may be included with the location information indicating how precise the location information is. For example, the location information may include an intersection of two streets, and the tolerance parameter may indicate that the information is accurate within ten blocks. Server 20 may cause the location information received at this step to be stored in a stored structure such as storage structure 23. Along with the location information, server 20 may store other information, such as: information regarding one or more of the users registered with server 20 associated with the location information, characteristics of the users submitting the location information, the times that the users arrived at and/or departed from the location associated with the location information, user preferences as to how the location information should be used, or other data associated with the location information. In some embodiments, server 20 may be configured to store the location type associated with the location information received at this step. As an example, server 20 may receive information about the location type from POI database 40 and store that information with the location information received at this step. Example location types include point-of-interest (POI), restaurant, business, historical site, shopping, names of businesses, museums, or other suitable descriptions of the geographic area identified by the location information. Information received and stored at step 210 may include event information related to the location information such as a concert, speech, or a sports event.

At step 220, in some embodiments, location information (such as persistent location information) from user 14 may be received by server 20. For example, historical location information may be received at this step indicating location areas or events at location areas where user 14 has been. User 14 may have arrived at location area 17*a* and terminal 10*a* may have transmitted the location information received at this step using information from location module 13. This transmission may have been performed passively or actively. For example, terminal 10*a* may have been configured to transmit location information as user 14 travels to various location areas. As another example, terminal 10*a* may have been configured to transmit location information when a particular application is launched on terminal 10*a*. As another example, terminal 10*a* may be configured to transmit location information in response to an indication from user 14 (i.e., user 14 presses a button or taps an active portion of a screen of terminal 10*a* to indicate that the location information should be sent).

At step 230, in some embodiments, the location information received at step 220 is compared to the location information stored at step 210 by analysis module 29. As an example, this may be done to determine whether other users have been in the same location area that user 14 is in or have attended the same event that user 14 is at as indicated by the location information received at step 220. As another example, this may be done to determine whether other users have been in the same location area that user 14 has been as indicated by the location information received at step 220. Various methods may be used to compare the location information at this step. Method used may, in various embodiments, be dependent on the type of location information received and/or stored at steps 210 and 220. For example, latitude and longitude coordinates may be compared to one another, and a threshold may be used to determine whether they are considered to be within the same location area. As another example, location information such as addresses, zip codes, or area codes may be compared to one another to determine where there is a match. As another example, location information such as latitude and longitude coordinates may be compared to an address by determining what location the latitude and longitude coordinates are indicate of and calculating a distance from that location to the address. The distance may then be compared to a threshold as discussed further below. As another example, latitude and longitude coordinates may be compared to a zip code by determining whether the location indicated by the coordinates falls within geographic area associated with the zip code. As another example, at this step the location type of the location information received at step 220 and the location information stored at step 210 may be compared.

At step 235, in some embodiments, analysis module 29 may determine whether differences between the location information received at step 220 and the location information received at step 210 is below a threshold. For example, a distance threshold may be used at this step. This may determine whether the location information being compared are geographically close enough to indicate a same location area. Multiple distance thresholds may be used depending on the type of location information being compared. For example, when comparing two addresses, the threshold might be set such that to be below the threshold the addresses must be the same. As another example when comparing addresses, the threshold might be set to allow for the addresses to differ by a specified amount (i.e., 3 blocks). As another example, if the location information being compared are two sets of latitude/longitude coordinates, then the threshold might be a distance between the two pairs of coordinates (e.g., two miles). As another example, when comparing an address to a zip code, the threshold may be that the address be located within the area associated with the zip code or may be that the address be located in the area associated with the zip or in an area adjacent to the area associated with the zip. As another example, when comparing location types, the threshold may be set such that a match is determined if the location types are the same. As another example, when comparing location types, the threshold may be set such that a match is determined if the location types are similar (i.e., a location type of a restaurant serving American cuisine may be considered a match to a location type of a restaurant serving Asian cuisine). The thresholds may be different based upon the location areas indicated by the location information. For example, thresholds may vary based on the city or region identified, such as using one threshold for a large city and another threshold for a small city. If the difference between the location information being compared is below the threshold, then users associated with the location information received at step 210 may be further considered at step 240. If it is determined that the location information being compared is at or above the threshold, then the users associated with the location information received at step 210 may not be considered further. In some embodiments, if the difference between the location information is at or above the threshold, then user 14 may not be in the same location area that the user had been whose location information is being compared.

In some embodiments, steps 230 and 235 may be performed multiple times as analysis module 29 analyzes the location information stored at step 210 from various users who have subscribed to server 20. Analysis module 29 may perform these steps with groups of users or may perform these steps with all the users whose location information is stored in storage structure 23. In some embodiments, steps 230 and 235 may be performed such that analysis module 29 determines whether user 14 visits the same or similar multiple location areas as users registered with server 20. For example, analysis module 29 may determine that user 14 and user 15 visit the same or similar multiple location areas or have attended the same event with a location area.

At step 240, in some embodiments, analysis module 29 may compare time information included with the location information received at step 220 with time information associated with the location information received at step 210 that was determined to be in the same location area at steps 230 and 235. The time information compared at this step may include milliseconds, seconds, minutes, hours, days, weeks, months, years and/or other suitable measurements of time. This step may be performed so that analysis module 29 may determine how long it has been since the users who were determined to be in the same location area as user 14 at steps 230 and 235 arrived at or departed from the location area and user 14 arrived at the location area. The time information compared at this step may be the time that user 14 arrived at the location area indicated by the location information received at step 220, the time that the other users arrived at that location area, the time that the other users left that location area, and/or the time that the other users arrived at a different location area. In some embodiments, the time that a user left a location area may be determined based on the time that the user arrives at the location area, the time that the user arrives at a different location area, or the period of time the user remained in the same location area.

At step 245, in some embodiments, the difference in the time information compared at step 240 may be compared to a time threshold. If the difference is greater than the threshold, then step 250 may be performed. If the difference is less than the threshold, then the associated users may no longer be considered. The difference being greater than a threshold may indicate that user 14 had arrived at a location area after another user left the location area. The difference being below the threshold may indicate that user 14 is at the location area with another user at the same time. Example time thresholds include 10 minutes, 20 minutes, and 1 hour.

In some embodiments, step 245 may be performed by determining whether any difference in the time information compared at step 240 is less than a time threshold. In such embodiments, if the difference is less than the threshold, then step 250 may be performed. If the difference is greater than the threshold, then the associated users may no longer be considered. Example time thresholds include 10 seconds, 10 minutes, 20 minutes, and 30 minutes. This may be applied in situations when analysis module 29 is configured to determine if user 14 has been to the same location area or location type as other users registered with server 20 at or near the same time. The time threshold discussed above may be configurable. For example, the time threshold may depend on the location information received at step 220. As another example, the time threshold may depend on the population density associated with the location information received at step 220.

In some embodiments, steps 240 and 245 may not be performed. For example, analysis module 29 may be configured to present user 14 with a notification of users registered with server 20 who have been in the same location area at the same time as or at a different time than user 14.

At step 250, in some embodiments, characteristics of certain users whose location information was stored at 210 may be compared to preferences and/or characteristics of user 14. The users whose characteristics are compared at this step may be users who have been in the same location area as user 14 and who have left the location area at a time sufficiently later than when user 14 arrived as discussed above with respect to steps 230 through 245. Examples of characteristics and/or preferences compared at step 250 may include interests, height, age, weight, sex, income, eye color, hair color, profession, residence or other suitable characteristics for matching. This step may be performed using information in storage structure 25, such as profile information of users registered with server 20.

At step 255, in some embodiments, it may be determined whether a sufficient number of preferences of user 14 match characteristics of the users compared at step 250. The number of matching characteristics may be set depending on desired levels of tolerance. For example, if user 14 has few potential matching candidates according to his or her preferences, then only one preference being satisfied may be sufficient. As another example, if there are many potential candidates that match with user 14, then more than one preference may be required to be met at this step. The determination at step 255 may be dynamic by responding to changes in the profile or preferences of user 14. For example, if user 14 changes the associated profile, the number of potential matching candidates may change. The change in the number of potential matching candidates may also change the determination of whether a sufficient number of preferences of user 14 have been matched that occurs at step 255. Step 260 may be performed with respect to users that have characteristics which satisfy a sufficient number of preferences of user 14. Users that do not have characteristics which satisfy a sufficient number of preferences of user 14 may no longer be considered in this process. In some embodiments, this may result in selecting only users that user 14 be interested in meeting. In some embodiments, one or more scores may be used in step 255. For example, a score may be given to one characteristic because it was close to matching a preference of user 14 while another characteristic may receive a lower score because it was not as close to matching a preference of user 14. These scores (separately or combined) may be compared to one or more thresholds to determine if the preferences have been matched. The scores may also be analyzed based on importance levels that user 14 has indicated regarding his or her preferences.

At step 260, in some embodiments, analysis module 29 may cause an indication to be presented to user 14 that includes information related to users of server 20 that were at a location area or location type where user 14 also was at some time. The information in the indication may include information regarding a location area at which a user registered with server 20 may have been present relative to a location area at which user 14 may be or have been present. The indication may not reveal the exact location area that user 14 has in common with the other users. For example, instead of indicating exactly which coffee shop or gym another user attends, the indication may disclose to user 14 the area, neighborhood, shopping center, street block, or other geographical description that user 14 has in common with user 15. As another example, the information in the indication may include information regarding the location type that user 14 has in common with other users registered with server 20 (e.g., user 14 and other users visit coffee shops, libraries, or bowling alleys). In some embodiments, the indication may include information indicating that: user 14 was at or near the same location area as user 15 at different times, user 14 was at or near the same location area as user 15 at the same or nearly the same time, user 14 was at the same location type as user 15 at the same or nearly the same time, or user 14 was at or near the same location type as user 15 at different times.

The information that may be included in this indication may include user identifiers used in communicating with server 20, real names, photographs, interests, personal information, contact information, and/or other characteristics of users registered with server 20. The list of users presented to user 14 at this step may be sorted by one or more factors including residence of the users, the difference in time between when those users left the location area and when user 14 arrived at the location area, how many preferences of user 14 are met, or other suitable characteristics or factors. The information may also include the difference in time between when user 14 arrived at the location area and when the users whose information is presented at this step arrived or left the location area. The information may also include the distance between the location information of user 14 received at step 220 and the location information of users whose information is presented at this step. The information presented at this step may indicate that user 14 and user 15 have a path or route in common (i.e., users 14 and 15 visit the same location areas in the same order).

The information presented at this step may be sent from server 20 to terminal 10a. Terminal 10a may provide user 14 with a notification that the indication is available to be presented. As an example, this information may be useful to user 14 in that user 14 may be able to determine which users user 14 missed the opportunity to meet and may be motivated to attempt to contact such users using one or more services offered by server 20. User 14 may perceive that he or she missed a connection with a potential match because of the indication that analysis module 29 caused to be presented at step 260. As another example of an advantage, user 14 may be able to determine characteristics of people who have visited the location area before and may determine to return because those characteristics are of interest to user 14. User 14 may be provided with information or options to contact people-of-interest. For example, user 14 may contact people-of-interest using a service offered by server 20, by e-mail, or by telephone. As another example of an advantage, user 14 may indicate that user 14 should not be matched with other users from the location areas user has visited after user 14 has been presented with the information at step 260.

In some embodiments, the steps of FIG. 2 may be performed in a different order than illustrated. For example, steps 250 and 255 may be performed before steps 230 and 235. As another example, steps 250 and 255 may be performed before steps 240 and 245.

FIG. 3 is a flowchart illustrating one embodiment of how analysis module 29 of FIG. 1C may provide an indication to user 14 of FIG. 1A of the number of users registered with server 20 of FIG. 1A (such as user 15) that have been at places in the same location area as user 14.

At step 310, in some embodiments, location information may be received by server 20 from users that have registered with one or more services offered by server 20 (such as user 15). This step may be performed similarly to step 210 of FIG. 2. Users registered with server 20 may have devices with them such as terminals 10a and 10b that transmit location information to server 20 actively or passively. The location information may be stored in a structure such as storage structure 23. Various types of location information may be received, such as a physical address or latitude/longitude coordinates.

At step 320, in some embodiments, places associated with location information received at step 310 may be determined. This step may be performed by analysis module 29. The location information received by step 310 may compared to one or more databases or services to determine what places are at or near the location information received at step 310. Examples of places determined at this step may include a type of place, a restaurant, a business, a shopping center, a neighborhood, a historical site, a service, or other points of interest. As another example, events occurring at a place may be determined. Places may be determined using a database or service such as POI database 40 of FIG. 1A. In some embodiments, multiple places may be determined for a given item of location information associated with one of the users registered with server 20. For example, an address may have been received at step 310, and, at step 320, a business associated with that address may be determined. As another example, a zip code may be received at step 310 and multiple businesses or neighborhoods may be determined at step 320. As another example, an address may have been received at step 310, and, at step 320, multiple businesses at or near that address may be determined.

At step 330, in some embodiments, the number of users associated with the places determined in step 320 may be determined. Analysis module 29 may perform this step. At this step, the places determined at step 320 from the information received at step 310 are then correlated to the users who sent the location information received at step 310. The number of users registered with server 20 that have been to the places determined at step 320 may be determined at this step. For example, it may be determined that ten users submit the location information that was associated with a restaurant determined at step 320.

At step 340, in some embodiments, server 20 may receive location information from user 14. This step may be performed similarly to step 220 of FIG. 2. User 14 may have caused this information to be sent via terminal 10*a*. This information may be sent via terminal 10*a* passively or actively.

At step 350, in some embodiments, one or more places may be determined from the location information received from user 14 at step 340. For example, if location information received at step 340 was a physical address, then one place may be determined such as a business, residence, or other entity occupying the physical address. As another example, if a zip code was received at step 340, then the places within the zip code (such as businesses, residences, neighborhoods and other entities within the zip code's region) may be determined. In some embodiments, information that refers to a specific geographic location (such as an address or latitude/longitude coordinates) multiple places may be determined. For example, if an address was received at step 340, then places in or around that address may be determined within a given radius (such as one mile, two blocks, 500 yards, and/or other suitable measurements). This step may be performed similarly to step 320. For example, POI database 40 of FIG. 1A may be used to compare the location information to the database to determine places such as points of interest that are in the database.

At step 360, in some embodiments, analysis module 29 may compare the places determined at step 350 to the places stored at step 320. This may be done to determine whether there is a match between the places determined at step 350 to the places stored at step 320. In some embodiments, this may be done to determine whether these place(s) are within the same geographic region (such as a block, neighborhood, zip code, shopping center, mall, or other suitable geographic region).

At step 370, in some embodiments, the number of users registered with server 20 and associated with the places determined at determined at step 350 are presented to user 14. This may be performed by identifying the number of users determined at step 330 corresponding to the matching places determined at step 360. For example, if a restaurant was determined to have 30 associated users registered with server 20 at step 330, and that restaurant was determined at step 350, 30 users would be determined at this step. After determining the number of users associated with the places determined at step 350, analysis module 29 may cause server 20 to send an indication of the places determined at step 350 and the number of registered users that have visited the places determined at step 350. In some embodiments this may be advantageous because user 14 may be presented with information regarding the number of users that frequent the places near which user 14 is located. For example, server 20 may offer a dating service or matchmaking service where user 14 and other registered users of server 20 are attempting to be matched or date each other. Being able to determine the number of registered users that have been to the places surrounding user 14 may be beneficial in that user 14 may be able meet the registered users in person in that location. As another example, user 14 may be a student and server 20 may be offering a service for students. Presenting user 14 with the number of other registered users of server 20 that have visited places surrounding user 14 may help user 14 to make a decision as to what place user 14 would prefer visiting. For example, if user 14 was attempting to choose a restaurant to eat at knowing that other students frequent that restaurant may help user 14 to make the decision. Terminal 10*a* associated with user 14 may receive the communication from server 20 and present the indication of the number of users and other places surrounding user 14 via a screen. Terminal 10*a* may provide a notification that server 20 has sent such information, such as a sound, icon, badge, or vibration. As another example, this information may be provided as an augmented reality experience for user 14 such that user 14 may be capable of moving terminal 10*a* to different location areas and receiving the number of other registered users in the places at the location areas. Such information may be visually represented on the screen of terminal 10*a* along with the places at the location areas.

FIG. 4 is a flowchart illustrating one embodiment of how analysis module 29 of FIG. 1C may receive preferred location information from user 14 of FIG. 1A and use it to enhance matching services with other users registered with server 20 of FIG. 1A (such as user 15).

At step 410, in some embodiments, location information from users registered with server 20 may be received and stored at server 20. This may be performed similar to step 210 of FIG. 2. Location information may be sent from terminals such as terminal 10*a* of users registered with server 20 actively or passively. Location information may include, for example, physical addresses or latitude/longitude coordinates. The location information and users associated with that location information may be stored at server 20 along with other information (such as the time the location information was received or sent) in a structure such as storage structure 23 of FIG. 1C.

At step 420, in some embodiments, preferred location information from user 14 may be received by server 20. For example, user 14 may be in a place such as a restaurant that user 14 appreciates. User 14 may desire to meet other people who also have visited the restaurant. As a result, user 14 may submit the location information of the restaurant to server 20 in order to be matched with others who have been at the restaurant. Terminal 10*a* may be used to send the preferred location information that is received at step 420. Examples of the location information received at step 420 may include latitude/longitude coordinates, an address, a city, a state, a zip code, a point of interest, and/or other suitable descriptions of a location. As an example, user 14 may use a mobile device, such as a smart phone, to start an application that is configured to communicate with server 20. When at a location that user 14 appreciates, user 14 may indicate to the application to send the current location information regarding user 14 to server 20. As another example, user 14 may be in a neighborhood that user 14 appreciates. User 14 may send the location information to server 20 in order to be matched with other users of server 20 that may be associated with the neighborhood. For example, server 20 may provide a matching service, a dating service, or a real estate listing service in which user 14 would want to be matched with those who are associated with the neighborhood.

At step 430, in some embodiments, analysis module 29 may compare the preferred location information received at step 420 to the location information stored at step 410. This may be done to identify registered users of server 20 that have location information associated with them that match or correspond to the preferred location information received at step 420. In some embodiments, location types corresponding to the location information are compared. Location types may be determined for the location information, and it may be determined whether there is a match in location types. Events occurring at places corresponding to the location information may be determined. For example, it may be determined that the preferred location information received at step 420 corresponds to a coffee shop. The location information submitted at step 410 may be analyzed to determine others who have been to coffee shops to see if there is a match in location type. Other characteristics may be taken into account during the comparison at step 430. For example, user 14 may specify other preferences regarding desired matches and those preferences may be compared to users identified by comparing the preferred location information to the stored location information. For example, user 14 may have registered with a dating service offered by server 20. User 14 may have specified that they prefer to be matched with users that are under the age of 40. Analysis module 29 may determine that a user over the age of 40 also had the same preferred location information and may disregard the user even though the preferred location information is the same as the stored location information. As another example, the preferred location information may be given more weight than other preferences submitted by user 14. For example, user 14 may specify that he would prefer to meet with people who have blonde hair yet analysis module 29 may determine matches with user 14 of those that do not have blonde hair yet have matching location information.

At step 440, in some embodiments, matches based on the comparison of the preferred location information to the stored location information may be presented to user 14. For example, analysis module 29 may cause such matches to be presented to user 14. In some embodiments, this may be advantageous in that user 14 may be able to provide more preferences to one or more services offered by server 20 in order to obtain more relevant results. User 14 may also have an opportunity to discover new preferences and efficiently provide them to server 20 to obtain more relevant results. The matches may be presented on devices that user 14 has access to, such as terminal 10*a*. The results may be presented as a response to user 14 submitting the preferred location information. For example, user 14 may enter into a location such as an museum and desire to be matched with those that have also attended a museum. As a response, server 20 may analyze the stored location information and provide the matches presented at step 440 within seconds, minutes, hours or days. User 14 may be notified of the new matches at terminal 10*a* as they are sent by server 20 or user 14 may appreciate the new matches when accessing one or more services offered by server 20 after sending the preferred location information. The matches presented at step 440 may be matches that server 20 has already determined prior to receiving the preferred location information but have been prioritized as a result of receiving the preferred location information. For example, based on an initial set of preferences submitted before the preferred location information was submitted by user 14, server 20 may have identified 100 candidates for potential matches with user 14. As a result of receiving preferred location information and identifying of those 100 candidates those who also have location information that corresponds to the preferred location information analysis module 29 may reorder the set of 100 users such that those with matching location information may be presented sooner to user 14 than those matches without corresponding location information. In some embodiments, this may provide an advantage in that user 14 may be able to perceive more relevant results sooner.

Figure 5:
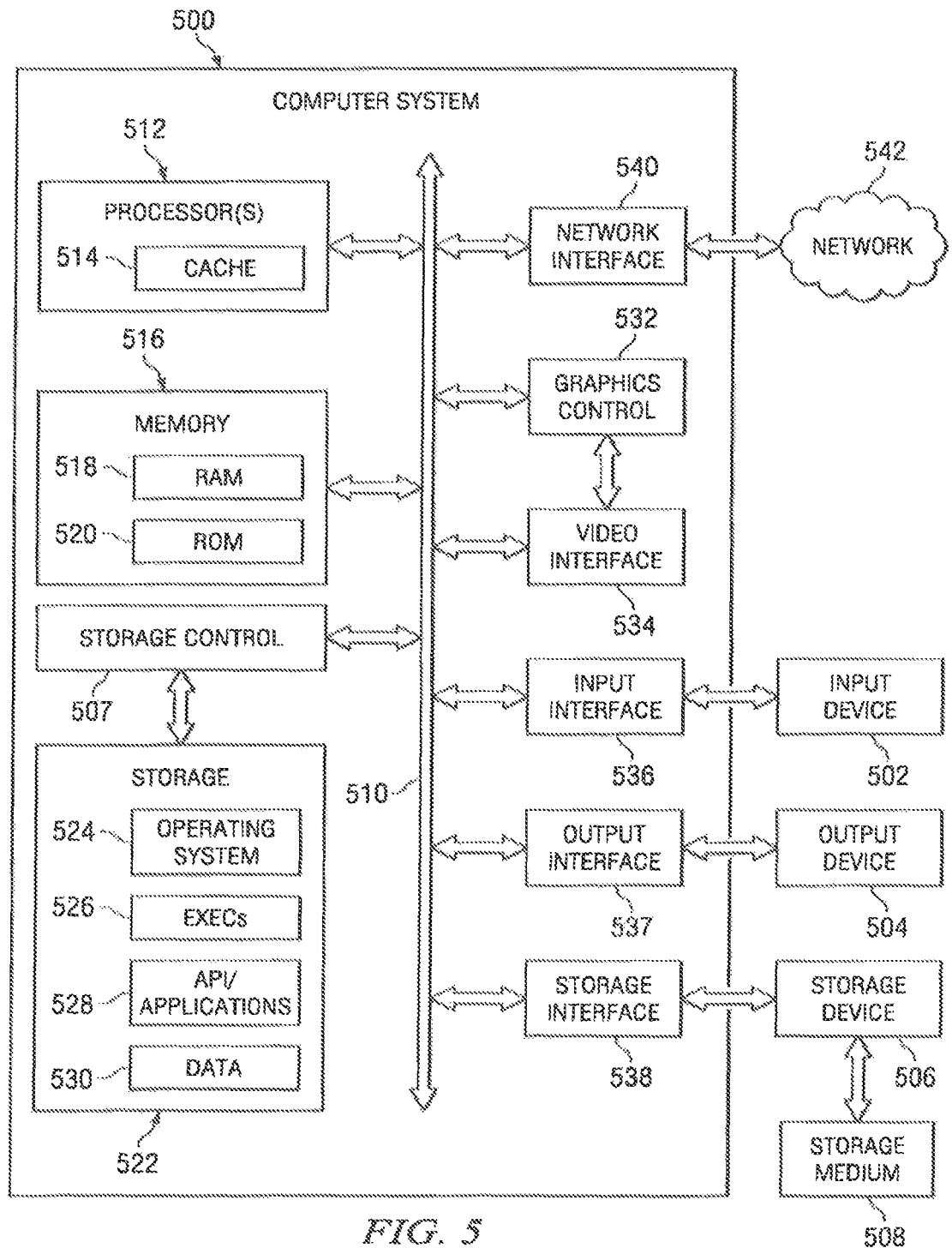
FIG. 5 illustrates an example computer system suitable for implementing one or more portions of particular embodiments.

FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1A-1C and one or more steps of FIGS. 2-4 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage medium 508. An input device 502 may be external or internal to computer system 500. An output device 504 may be external or internal to computer system 500. A storage device 506 may be external or internal to computer system 500. A storage medium 508 may be external or internal to computer system 500. In some embodiments, terminals 10*a* and 10*b*, server 20, and POI database 40 of FIG. 1A may be implemented using some or all of the components described above included in computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to. Industry Standard Architecture (ISA) bus. Enhanced ISA (EISA) bus, Micro Channel Architecture (MCA) bus, Video Electronics Standards Association local (VLB) bus. Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include random access memory (RAM) 518 and read-only memory (ROM) 520. Data and instructions may transfer bidirectionally between processors 512 and RAM 518. Data and instructions may transfer unidirectionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In some embodiments, fixed storage 522 may include network resources, such as one or more storage area networks (SAN) or network-attached storage (NAS). In some embodiments, memory 26, storage structures 23 and 25, and analysis module 29 of FIGURES IA and IC may be implemented using configurations such as the description of memory 516 above.

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of particular embodiments. Particular embodiments may execute solely on processors 512. Particular embodiments may execute on processors 512 and on one or more remote processors operating together. In some embodiments, processors 512 may be used to implement analysis module 29 of FIG. 1C and/or may perform the steps specified in instructions or code included in analysis module 29 of FIG. 1C.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 516 may include one or more tangible, non-transitory, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs. In some embodiments, memory 26, storage structures 23 and 25, and analysis module 29 of FIGS. 1A and 1C may be implemented using configurations such as the description of memory 516 above.

In some embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although several embodiments have been illustrated and described in detail, it will be recognized that substitutions and alterations are possible without departing from the spirit and scope of the appended claims.

What is claimed is:
1. A system, comprising:
an interface configured to:
receive first location information associated with a first user;
a hardware processor communicatively coupled to the interface, and configured to:

determine a location type related to the first location information, the location type indicating a preference of the first user;

add a badge related to the location type to a user profile of the first user, the badge signifying the preference of the first user with respect to location type;

determine that a second user is associated with the location type; and cause information associated with the second user to be presented to the first user.

2. The system of claim 1, wherein the badge indicates that the first user is associated with the location type.

3. The system of claim 1, wherein the badge is an indication of a historical site, a library, a restaurant, or an event.

4. The system of claim 1, wherein the first location information is related to a location that the first user has visited in the past.

5. The system of claim 1, wherein the first location information is related to a location that the first user is currently visiting.

6. The system of claim 1, wherein determining that the second user is associated with the location type comprises determining that the second user has visited a location with the location type in the past.

7. The system of claim 1, wherein determining that the second user is associated with the location type comprises determining that the second user is currently visiting a location with the location type.

8. The system of claim 1, wherein:
the interface is further configured to:
receive second location information associated with a second user;
the hardware processor is further configured to:
determine that the first user has departed from a location with the location type at a first time;
determine that the second user has arrived at the location with the location type at a second time;
determine a time difference between the first time and the second time; and
cause to present a notification to the second user, the notification indicating that the first user was at the location relative to when the second user has arrived at the location based at least on the time difference.

9. The system of claim 8, wherein:
the hardware processor is further configured to determine that that the first user and the second use have one or more characteristics in common with one another; and
causing to present the notification is based at least on determining that the first user and the second user have the one or more characteristics and the location type in common with one another.

10. The system of claim 1, wherein adding the badge related to the location type to the user profile is in response to:
presenting an option to add the badge to the first user; and
receiving a user input that indicates to add the badge related to the location type to the user profile.

11. A method, comprising:
receiving first location information associated with a first user;

determining a location type related to the first location information, the location type indicating a preference of the first user;

adding a badge related to the location type to a user profile of the first user, the badge signifying the preference of the first user with respect to location type;

determining that a second user is associated with the location type; and causing information associated with the second user to be presented to the first user.

12. The method of claim 11, wherein the badge indicates that the first user is associated with the location type.

13. The method of claim 11, wherein the badge is an indication of a historical site, a library, a restaurant, or an event.

14. The method of claim 11, wherein the first location information is related to a location that the first user has visited in the past.

15. The method of claim 11, wherein the first location information is related to a location that the first user is currently visiting.

16. The method of claim 11, wherein determining that the second user is associated with the location type comprises determining that the second user has visited a location with the location type in the past.

17. The method of claim 11, wherein determining that the second user is associated with the location type comprises determining that the second user is currently visiting a location with the location type.

18. The method of claim 11, further comprising:
receiving second location information associated with a second user;
determining that the first user has departed from a location with the location type at a first time;
determining that the second user has arrived at the location with the location type at a second time;
determining a time difference between the first time and the second time; and
causing to present a notification to the second user, the notification indicating that the first user was at the location relative to when the second user has arrived at the location based at least on the time difference.

19. The method of claim 11, wherein adding the badge related to the location type to the user profile is in response to:
presenting an option to add the badge to the first user; and
receiving a user input that indicates to add the badge related to the location type to the user profile.

20. A non-transitory computer-readable medium encoded with logic, the logic configured, when executed, to:
receive first location information associated with a first user;
determine a location type related to the first location information, the location type indicating a preference of the first user;
add a badge related to the location type to a user profile of the first user, the badge signifying the preference of the first user with respect to location type;
determine that a second user is associated with the location type; and
cause information associated with the second user to be presented to the first user.

* * * * *